United States Patent [19]
Bohn

[11] Patent Number: 6,122,559
[45] Date of Patent: Sep. 19, 2000

[54] HAND HELD COMPUTER FOR INPUTTING SOCCER DATA

[76] Inventor: David W. Bohn, 10805 Brass Kettle Rd., Raleigh, N.C. 27604

[21] Appl. No.: 09/017,331

[22] Filed: Feb. 2, 1998

[51] Int. Cl.[7] .................................................. G08B 23/00
[52] U.S. Cl. ................... 700/91; 700/92; 463/1; 434/247
[58] Field of Search ................... 700/91, 92, 93; 463/1, 43; 473/480, 415; 340/323 R; 273/317, 108; 434/247, 251

[56] References Cited

U.S. PATENT DOCUMENTS

| 4,128,893 | 12/1978 | Johnson et al. | 700/91 |
|---|---|---|---|
| 4,220,992 | 9/1980 | Blood et al. | 700/91 |
| 4,814,986 | 3/1989 | Spielman | 700/91 |
| 4,868,772 | 9/1989 | Collard | 700/91 |
| 4,900,027 | 2/1990 | Sheridan | 700/92 |
| 4,904,981 | 2/1990 | Mele et al. | 700/92 X |
| 4,956,775 | 9/1990 | Klamer et al. | 700/92 X |
| 4,974,161 | 11/1990 | Cullen | 700/92 |
| 4,977,503 | 12/1990 | Rudnick et al. | 700/91 |
| 5,027,102 | 6/1991 | Sweeny | 700/92 X |
| 5,039,977 | 8/1991 | Mele et al. | 700/92 X |
| 5,134,565 | 7/1992 | Herbertz | 700/92 X |
| 5,153,826 | 10/1992 | Johnson | 700/91 |
| 5,181,009 | 1/1993 | Perona | 700/92 X |
| 5,363,297 | 11/1994 | Larson et al. | 700/91 |
| 5,412,188 | 5/1995 | Metz | 700/91 X |
| 5,489,886 | 2/1996 | Wexler et al. | 700/91 X |
| 5,513,854 | 5/1996 | Daver | 700/91 |
| 5,536,010 | 7/1996 | Lambourne | 700/92 |
| 5,557,717 | 9/1996 | Wayner | 700/92 |
| 5,574,422 | 11/1996 | Martin | 700/92 |
| 5,636,920 | 6/1997 | Shur et al. | 700/91 |
| 5,653,634 | 8/1997 | Hodges | 700/91 |
| 5,898,587 | 4/1999 | Bell et al. | 700/92 |

Primary Examiner—Valencia Martin-Wallace
Assistant Examiner—John M. Hotaling
Attorney, Agent, or Firm—Mills Law Firm PLLC

[57] ABSTRACT

A hand held soccer scoring computer for tracking and recording conditions and activities taking place in a soccer match includes a keypad for entering and a display for showing information evolving during the course of the event with regard to player, team, activity and activity location, and the game time associated with the entry. The recorded data may be contemporaneously reviewed and edited and upon completion of the soccer match transferred to a processor printing in desired statistical formats.

12 Claims, 12 Drawing Sheets

HAND HELD COMPUTER FOR INPUTTING SOCCER DATA

BACKGROUND OF THE INVENTION

The present invention relates to hand-held scoring devices for sporting events and, in particular, to a hand-held scoring computer for inputting data related to soccer game activities on a real-time basis as to team, player, activity and location and, after the event is completed, downloading the data into a computer for reporting and analyzing aspects of the game.

Statistics are commonly kept for various sporting events to denote the performance of the team and its players with regard to the basic relevant activities of the game. Such statistics provide a continuously updated account of the team and player performance over the course of a game or season. This enables determinations of scoring, location, tendencies, penalties and the like.

It is also desirable to memorialize when and from where certain activities take place. In games such as soccer wherein the play takes place on a continuous basis without timeouts or a stopping of the clock, it is oftentimes difficult to contemporaneously record all of the significant events or at a later time reconstruct the missing data.

Traditionally, such statistics have been recorded manually and the limitations attendant thereto are well recognized. In order to overcome some of the limitations associated with manual scoring. Various approaches have been proposed to alleviate such cumbersome and time-consuming process. For example, U.S. Pat. No. 5,412,188 to Metz, discloses a bar code based recording system for tracking various activities related to basketball, such as team, player, shot location and type of shot. However, this system requires considerable space for set up comprising three separate bar coded charts, which are read by a bar code scanner, and entered into a computer. The multiplicity of components, the space required for setup and operation, and manual activities associated with this approach does not lend the system for use as a real time sideline recording system.

U.S. Pat. No. 5,153,826 to Johnson discloses a sports statistics calculator wherein a handheld, portable device is used to keep track of certain aspects of a tennis games, primarily the recording of type and playability of shots. The inputted information may be downloaded to a computer for analysis subsequent to the game. However, each type of shot requires a dedicated keyboard and provides only summary information regarding the game. The system is also limited to a single match with two contestants.

U.S. Pat. No. 5,377,982 to Villarreal discloses a portable electronic scorekeeper which allows the user to document and record certain information related to a baseball game on a player and team basis but is primarily related to securing only summary score card type information. The system does not allow the user to track the location and flow of activities related to a particular sporting activity.

U.S. Pat. No. 5,558,333 to Kelson et al. al. discloses a microcomputer system for recording various activities related to a golf game on a hole by hole basis. The system tracks distances, clubs, shot length and other aspects related to the golf round. However, such data is not tracked contemporaneously with the game and provides only a single coordinate, i.e. length, of location.

U.S. Pat. No. 4,879,651 to Little discloses a wrist carried microcomputer worn by a player for recording information based on a won-lost outcome with a limited ability to track the type of a shot resulting in the outcome. The device is limited to single player and not usable in a team sport activity.

SUMMARY OF THE INVENTION

The present invention overcomes the above limitations on exactingly and contemporaneously recording significant activities of a sporting event on a real time basis that can be reviewed and analyzed with regard to individual and team performance based on detailed characterization of the activities which took place. More particularly, the present invention provides a portable hand held computer for tracking and recording activities regarding a sporting event, such as a soccer match, on based on player identification, team, activity, time and location by inputting such information on a single, compact multipurpose keypad. All significant aspects of the match can be characterized time stamped and stored as they occur and may be conveniently edited for necessary correction. Multiple games can be recorded enabling the computer to be repetitively used before downloading the data. In this manner, coaches and players may review the documented performance for assessing individual and team strengths, weakness, tendencies and productivity.

Accordingly, it is an object of the present invention to provide a compact, conveniently operably handheld system for tracking and recording significant activities occurring during the course of a sporting event.

Another object of the present invention is to provide a hand held computer for inputting data regarding a team sporting event in real time, specifically recording information on a single entry keypad related to significant aspects of the game as to activity, player, team, location and time.

A further object of the present invention is to provide a portable hand held computer usable by a score on the sidelines of a soccer match for tracking and recording significant activities of the match such as shots, goals, assists, passes, penalties, substitutions, and the like with regard to player and team identification, location of activity, and time thereof.

Yet another object of the present invention is to provide a hand held system usable without supplemental equipment for recording relevant information with regard to a sporting activity including playing conditions and significant activities.

BRIEF DESCRIPTION OF THE DRAWINGS

The above and other objects and advantages of the present invention will become apparent to those skilled in the art upon reading the detailed description of the preferred embodiment taken in conjunction with the accompanying drawings in which.

DETAILED DESCRIPTION OF THE PREFERRED EMBODIMENT

Figure 1:
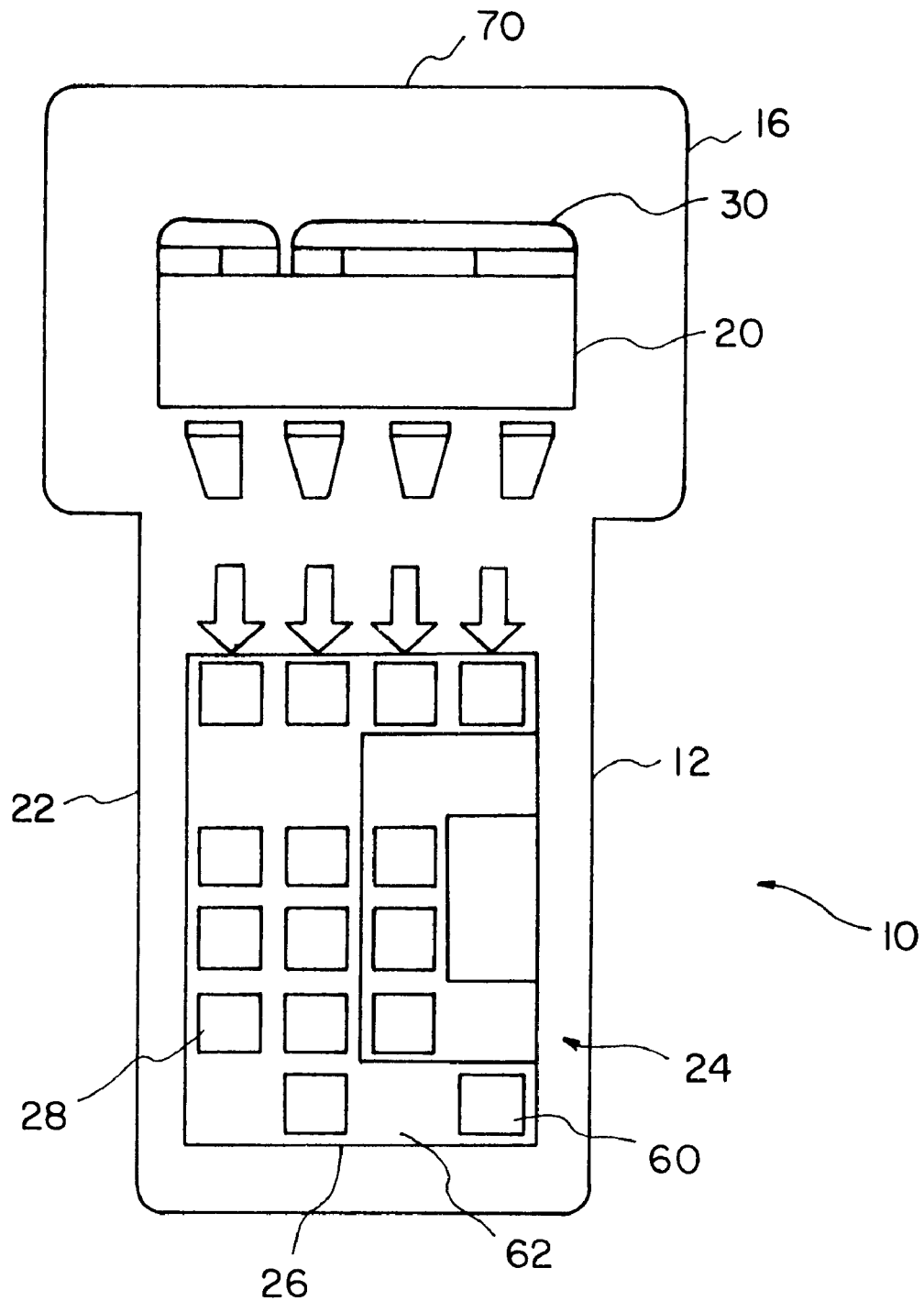
FIG. 1 is a front view of a hand held scoring computer in accordance with the present invention.

Referring to the drawings, FIG. 1 illustrates a hand held scoring computer 10, in accordance with the present invention. The computer 10, as hereinafter described in detail, may be used for securing real time data related to various aspects of a sporting event with relation to time, activity, player team, and importantly location. The data so generated then may be outputted in report form to provide a recapitulation of various aspects of the sporting event being played.

The computer 10 is particularly useful in securing data related to the game of soccer and hereinafter will be described with reference thereto. However, those skilled in the art will appreciate that the present invention may be utilized in securing data with respect to other sporting activities such as basketball, baseball, football, tennis and other like events where it is beneficial to be able to input key data regarding the event on a real time basis and thereafter output the data in format for review and analysis.

More particularly, the computer 10 comprises a hand held enclosure 12, which houses the functional components as described below. The computer 10 is battery powered and of a size and weight which permits convenient handling and operation by personnel on the sidelines or in the viewing area of the game. The enclosure 12 is preferably formed in a conventional manner as two piece plastic housing and includes a conveniently accessible front face for inputting and viewing instructions and data related to the game. The front face is generally T-shaped including an upper head portion 16 containing a four line LCD display 20, and a base portion 22 containing a keyboard 24 comprising a 4 by 6 array 26 of pressure sensitive manually actuated switches, representatively indicated by the numeral 28.

The front face of the upper head portion 16 of the enclosure 12 is provided with a heat stamped legend status bar 30 above and adjacent to the top line of the display 20. The status bar 30 is divided into columns for indicating the score of the game for the two teams participating, the number of the game being scored, the time period being scored (status) and the elapsed time of the time period.

The array 26 of the keyboard is provided with a legend 32 graphically depicting one half of a soccer field. The sides 34, 36, 38, 40 of the array 26 represent the sidelines, end line and the midfield line, with rectangular boxes 42 and 44 representing the goal and the penalty. As hereinafter described this graphical representation of the field enables the scorer to input valuable location information regarding the various activities taking place during the course of the game.

The array 26 of switches or keys 28 includes a first plurality or top row 50 of four keys which are used as function switches and are actuated in response to software prompts which are displayed in the lower row of the display 20. In response such prompts, the scorer inputs appropriate responses related to game conditions, activities and the like.

A second plurality or U-shaped group 52 of the keys 28 is dedicated for the inputting of various activities being tracked in the game. Such activity keys include the second horizontal row of switches, the bottom row of switches and lower five switches on the right hand column. As illustrated, such activities to be documented include; shot, assist, foul, corner kick, off side, pass, trap and substitution.

The right hand corner key 60 is used as an on/off switch to enable and disable the computer. The adjacent setup key 62 is used for inputting the game conditions.

The remaining or third plurally of keys 64 controls is dedicated to keys for inputting numerical data related to the event such as player identification, together with relevant data related to game conditions in the setup mode.

The computer 10 is provided with a communication port, shown in dashed lines by the numeral 70 for downloading data to a processing unit such as a personal computer for archiving, reviewing and analyzing the data accumulated during a recorded game or games.

Figure 2:
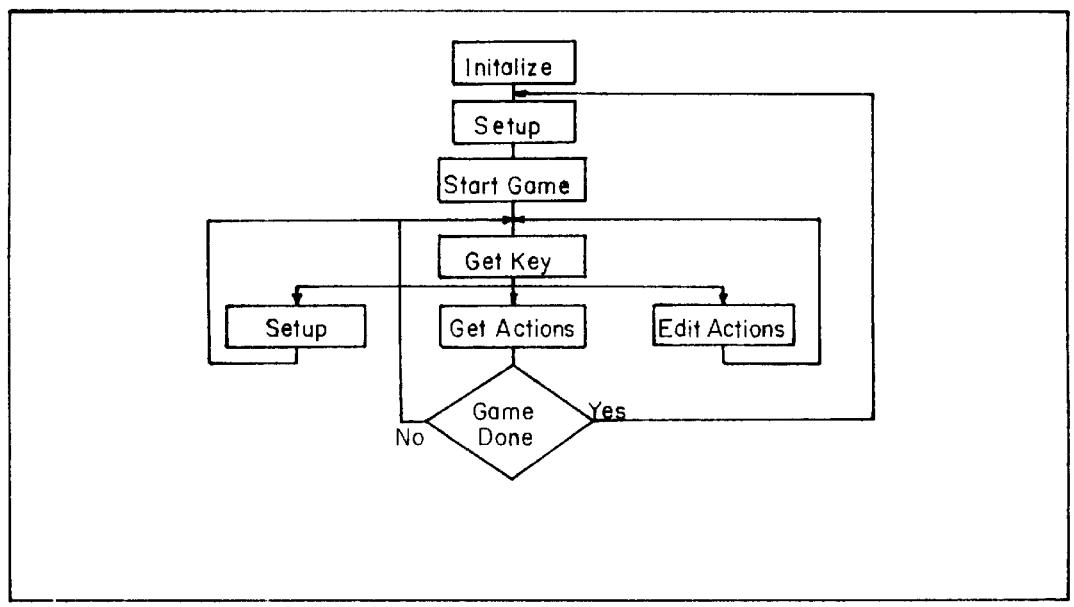
FIG. 2 is a general software flow diagram for the hand held scoring computer as shown in FIG. 1.

Referring to FIG. 2, the illustrated block diagram shows the interrelationship of the electronic components of the computer. The keyboard 100 and the display 102 are located on the front face of the enclosure and operatively connected to a printed circuit board 104 located and mounted conventionally interior thereof.

The keyboard 100 is connected to a keypad connector 110 and keypad interface 112 and microprocessor 114. The display 102 is connected to a LCD connector 120, a LCD interface 122 to RAM 124. The RAM is connected to the Microprocessor 114 by address line 126 and data line 128. An address decoder 130 is connected between the address line and the RAM and LCD.

A battery power supply 140 is connected to the microprocessor 114 through power/monitor regulator 142. For audible cueing for various data entries audible means such as a buzzer 114 are connected to the microprocessor 114.

The communications port described above is connected to the microprocessor through phone connector 150 and serial interface 152. The function keys prompts a number of responses related to the selected activity event. For example, if the shot key is depressed the scorer is prompted with four aspects thereof, is it a goal, is it a shot on goal, it is a shot at a location or is it a save. After entry of the shot activity, the display prompts for entry of a player number, a team indication and a field location. The second and third lines then display the result of the entries, including an activity number, a time stamp for the event, and the bottom lie again displays the status line and awaits entry of the activity. A similar routine is provided for assists For a foul, the foul switch is depressed and the display then provides four options related to the foul for selection by the top four switches. Such options may include a regular foul, a yellow card foul, a red card foul, and/or a penalty kick. After selection of the foul option, the display prompts entry of the player data. Such information is entered on the numerical keys. After entry of the player data, the display prompts by flashing the relevant portions of the display, the team on which the foul is being called. The scorer then enters on the top row of switches, the team charged with the foul. After entry of the team the display then prompts for a field location for the foul. The scorer then depresses the switch on the keyboard representing the location whereat the foul occurred. After entry of the location, the display indicates for a time period the summary of the activity, namely foul type, player number, team and field location.

For the corner kick, the scorer enters the player number, the team, and the field location. If a location other than a corner is selected the display so notes the error and again prompts for a proper location for the corner.

For "off side", the player number, team and field location are required.

For "pass", the scorer is prompted to enter the type of pass on the function keys, i.e. pressure pass or no-pressure pass. Thereafter, the player number, the team and the field location are entered to complete the activity.

For "trap", the scorer sequentially enters player number, team and optionally the location are entered.

For "substitution", the display prompts for entry of the type, in or out. Then the player number, the team, and thereafter the player entering the event.

The display is preferably a four line, 10-character LCD device. The display includes an upper status line. A legend above the display denotes significant aspects of the game. The left portion represents the current score of the game. The right portion represents the game number, the status of the indicated game and the elapsed time of the event.

At any time during the course of the game, the scorer may enter the edit mode by depressing the indicated function key for this function. The scorer by using the function keys can scroll through the previously entered activities for review of the entries to date, entering revisions as required.

Figure 3:
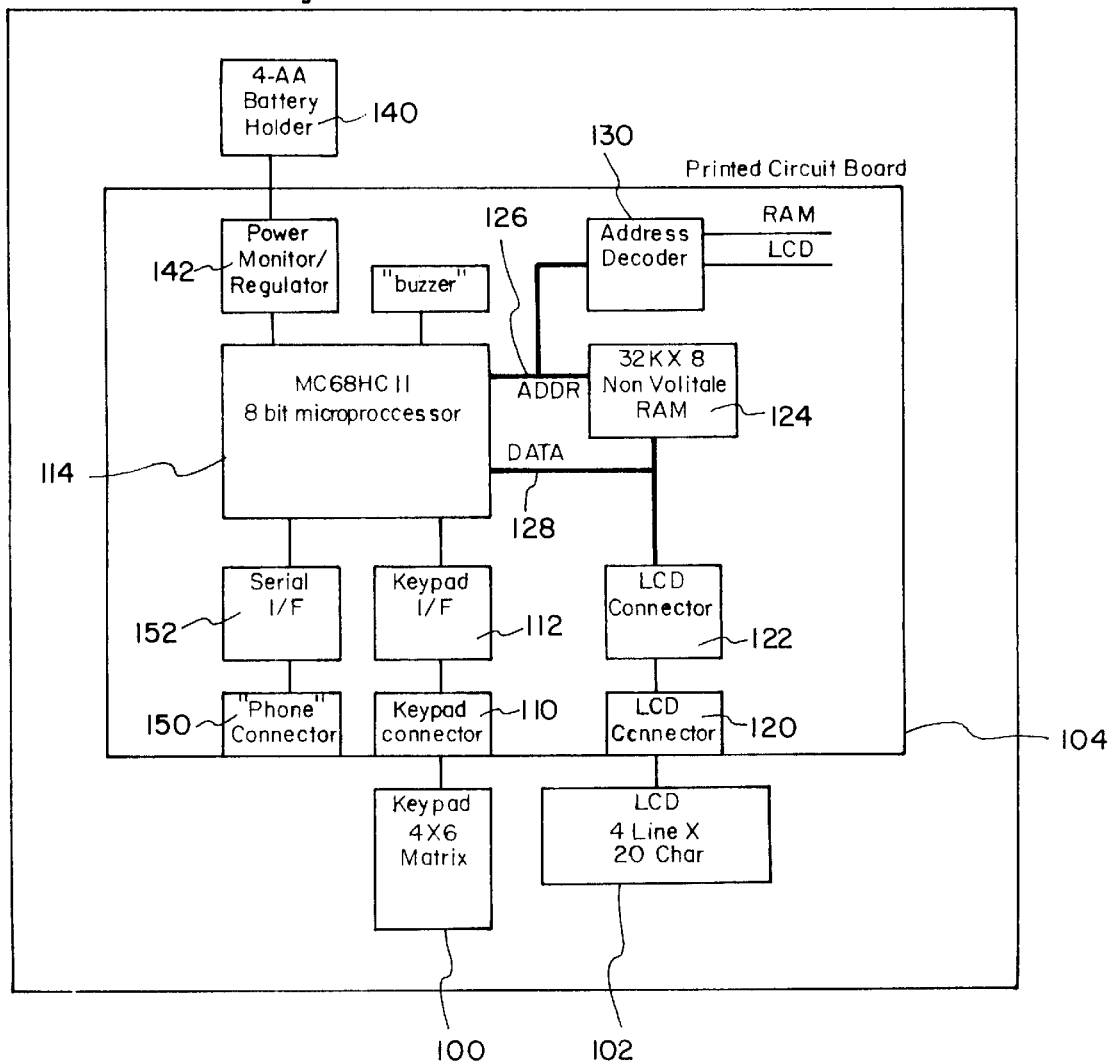
FIG. 3 is a block diagram of the functional components used in the hand held scoring computer of the present invention.
Figure 5A:
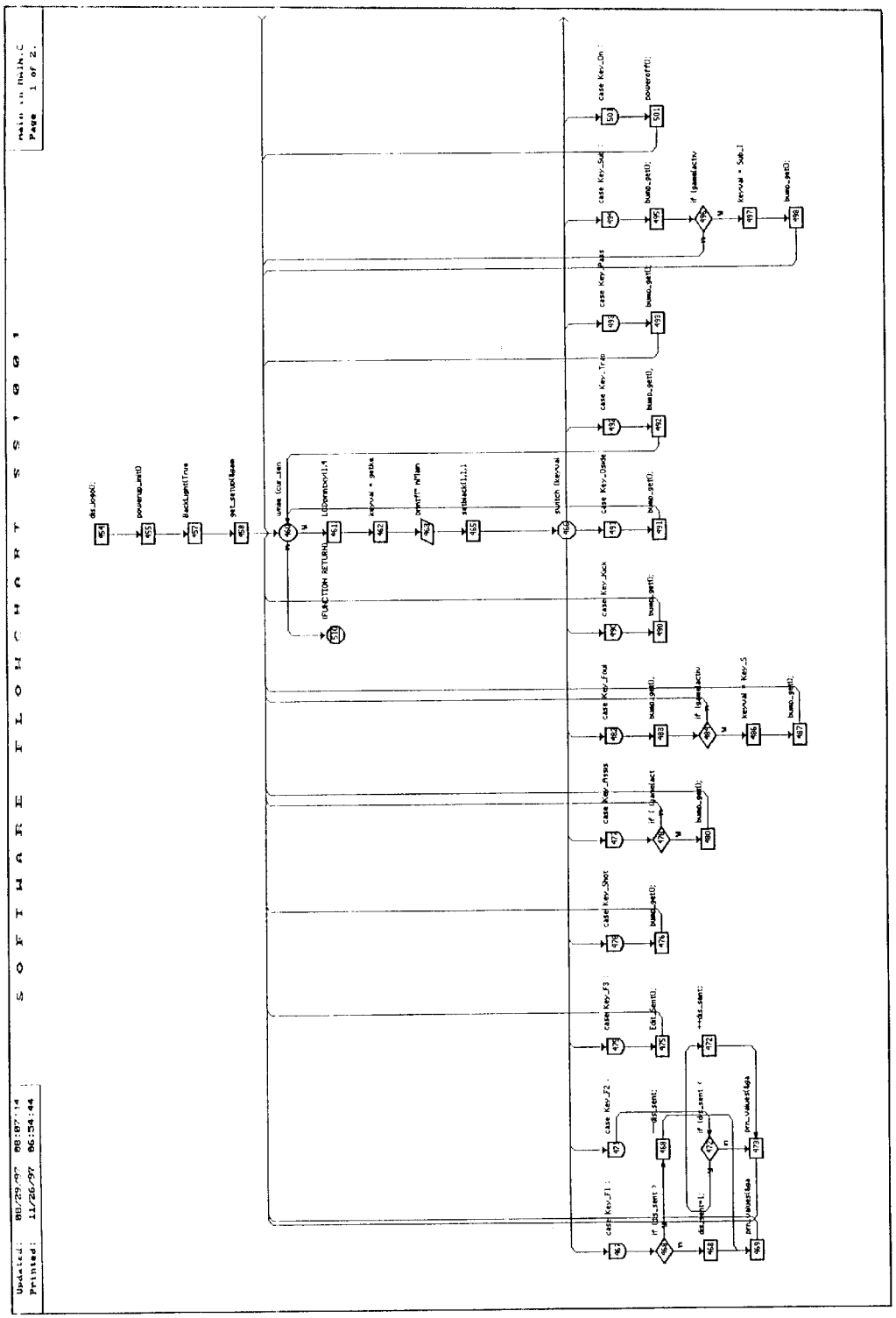
FIGS. 5 through 11 are additional software flow charts for the hand held scoring computer of the present invention.
Figure 5B:
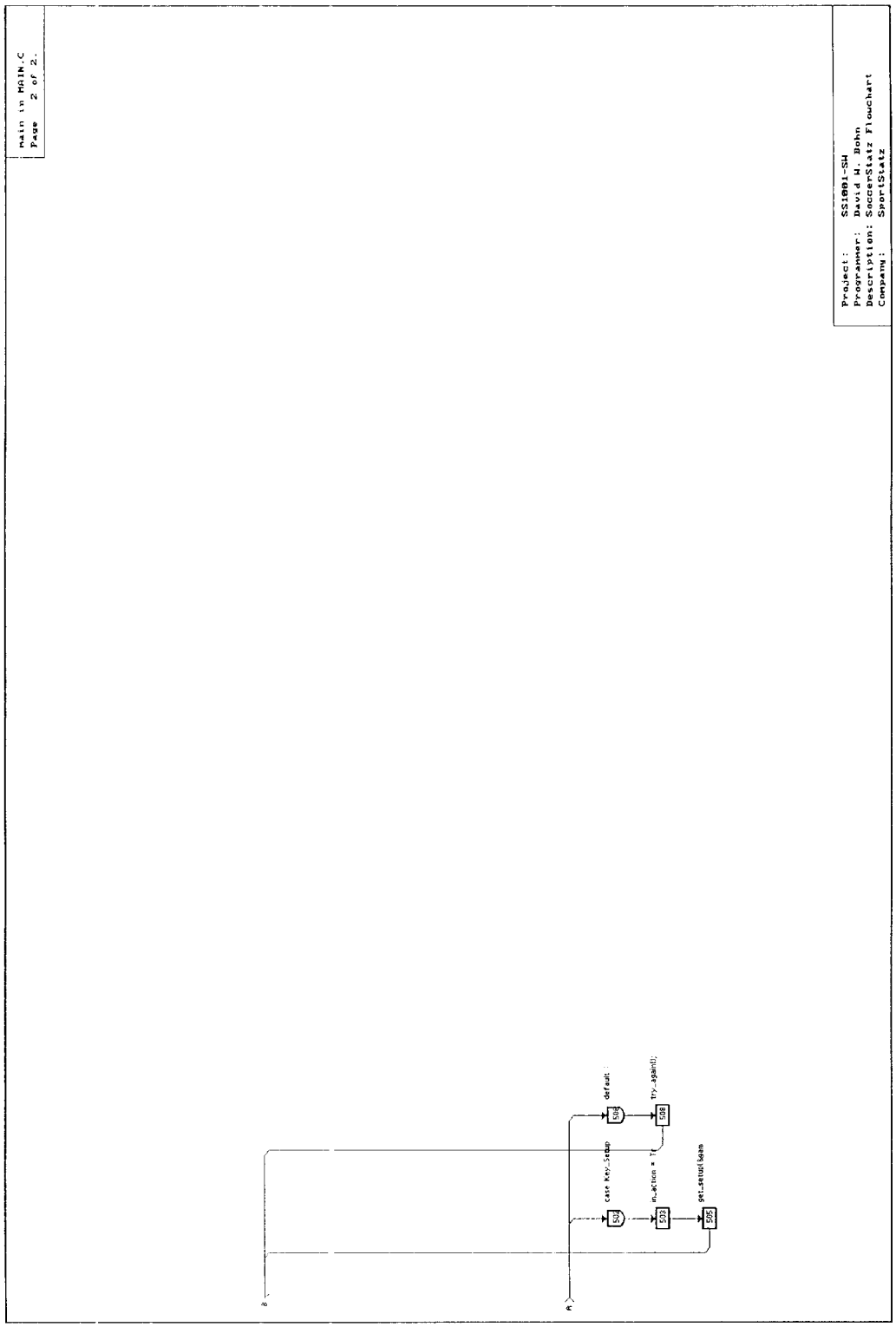
Figure 6:
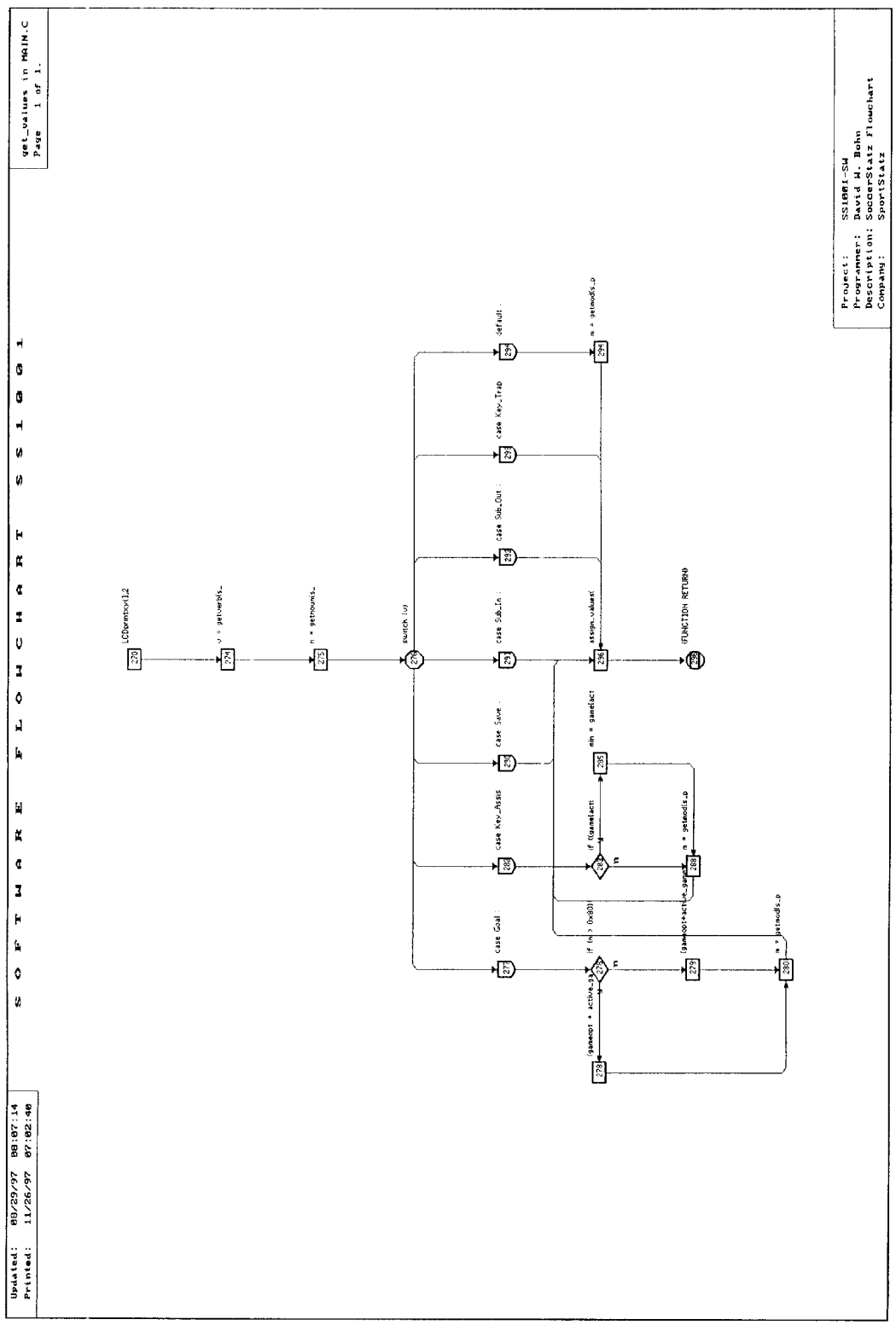
Figure 7:
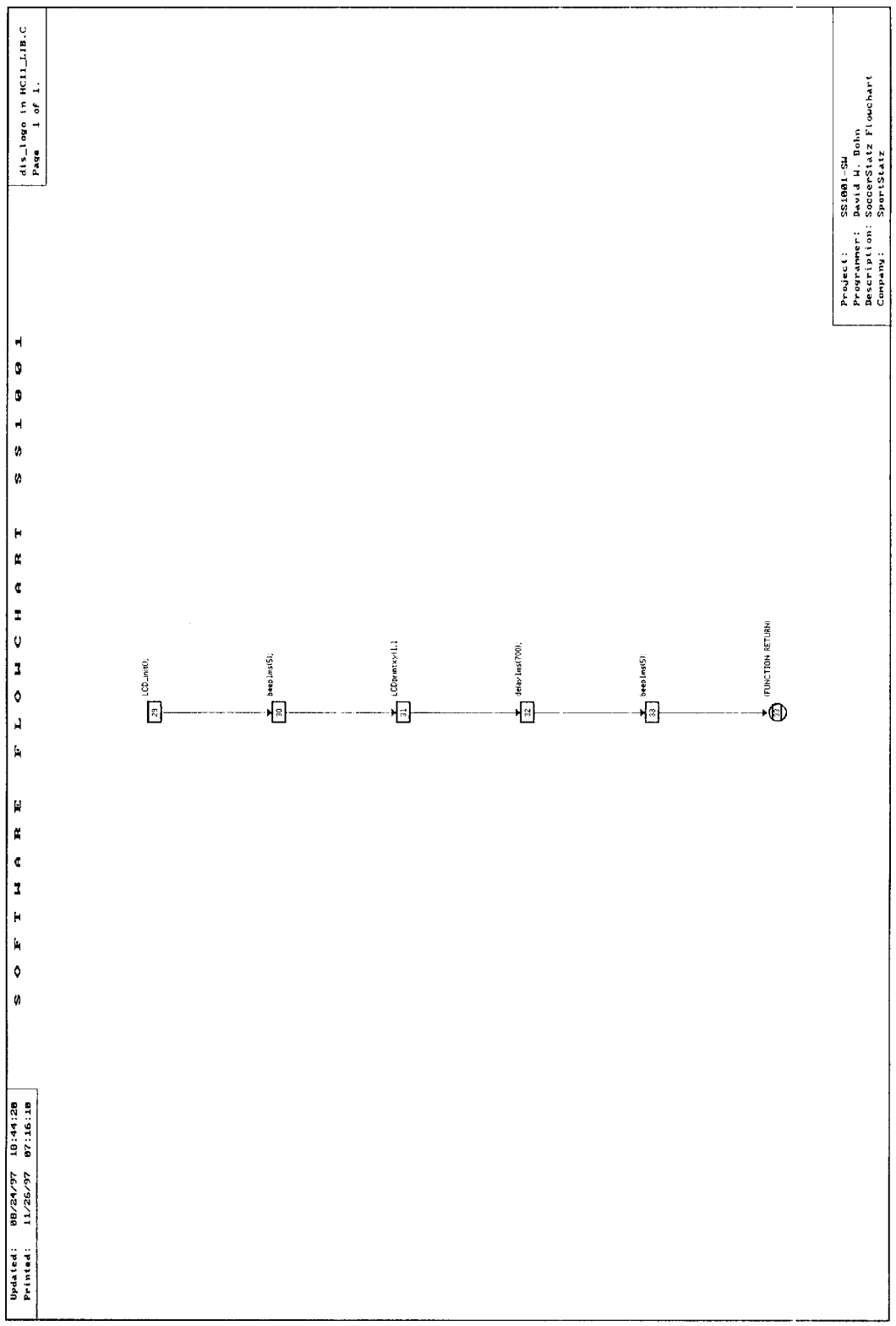
Figure 8:
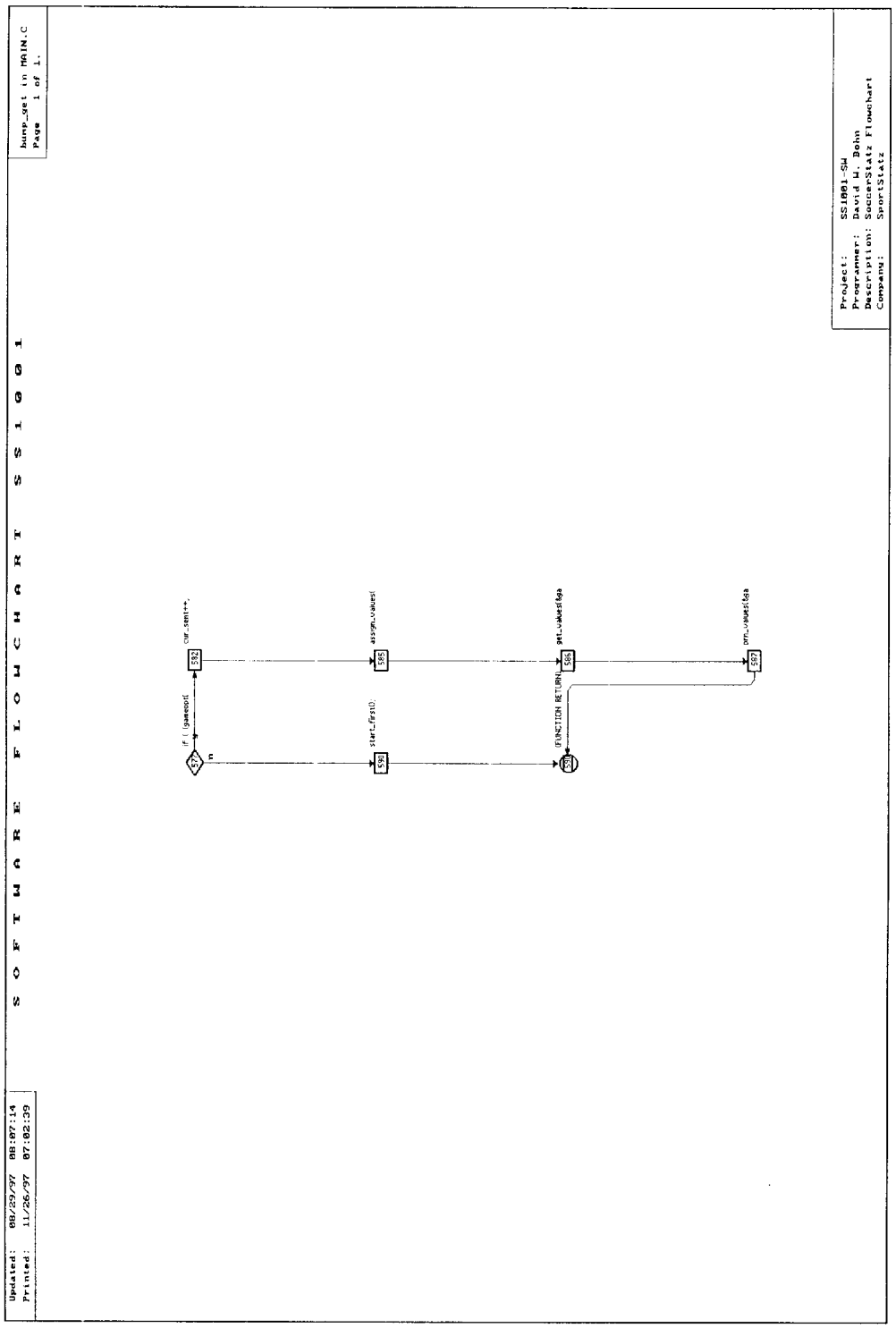
Figure 9:
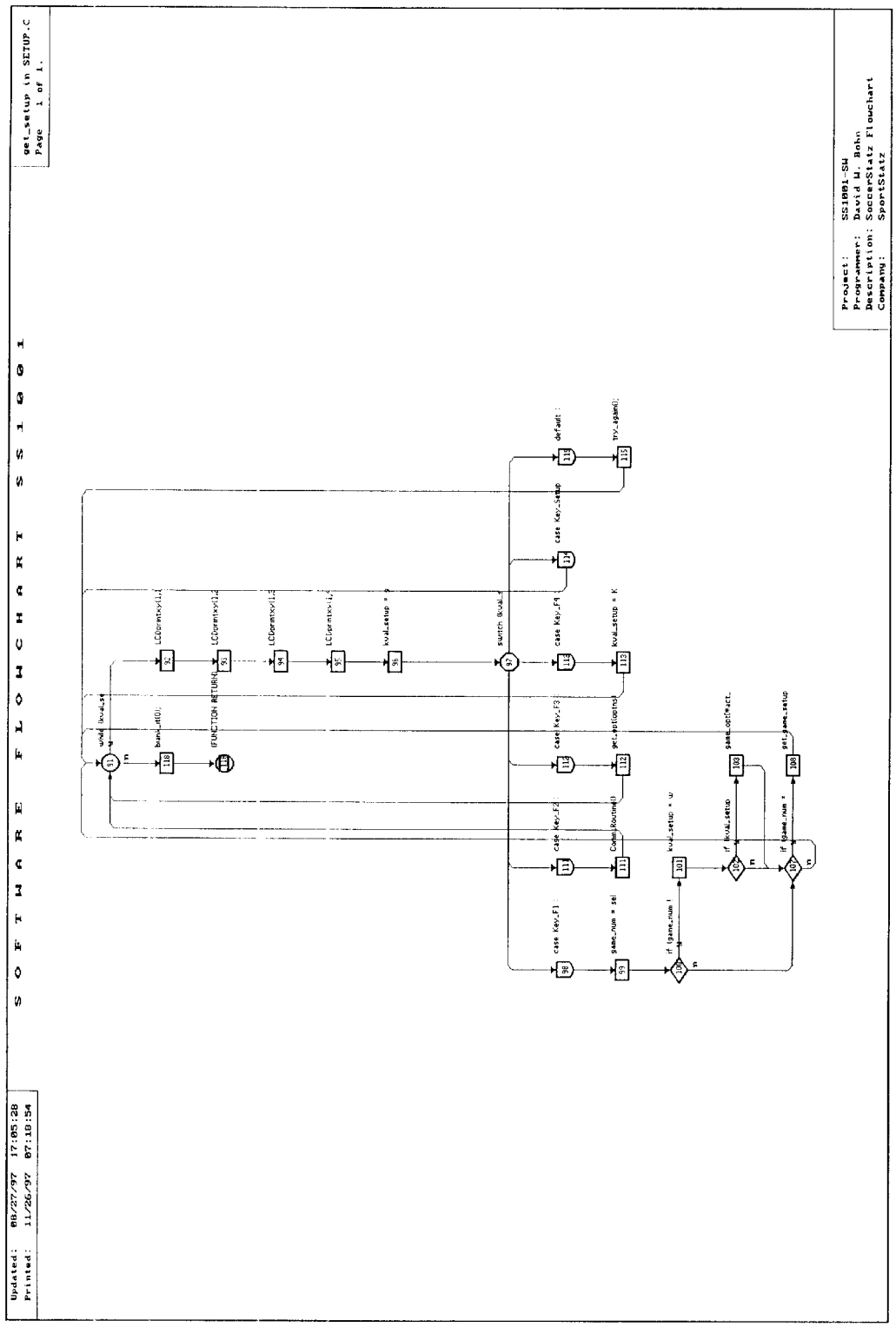
Figure 10:
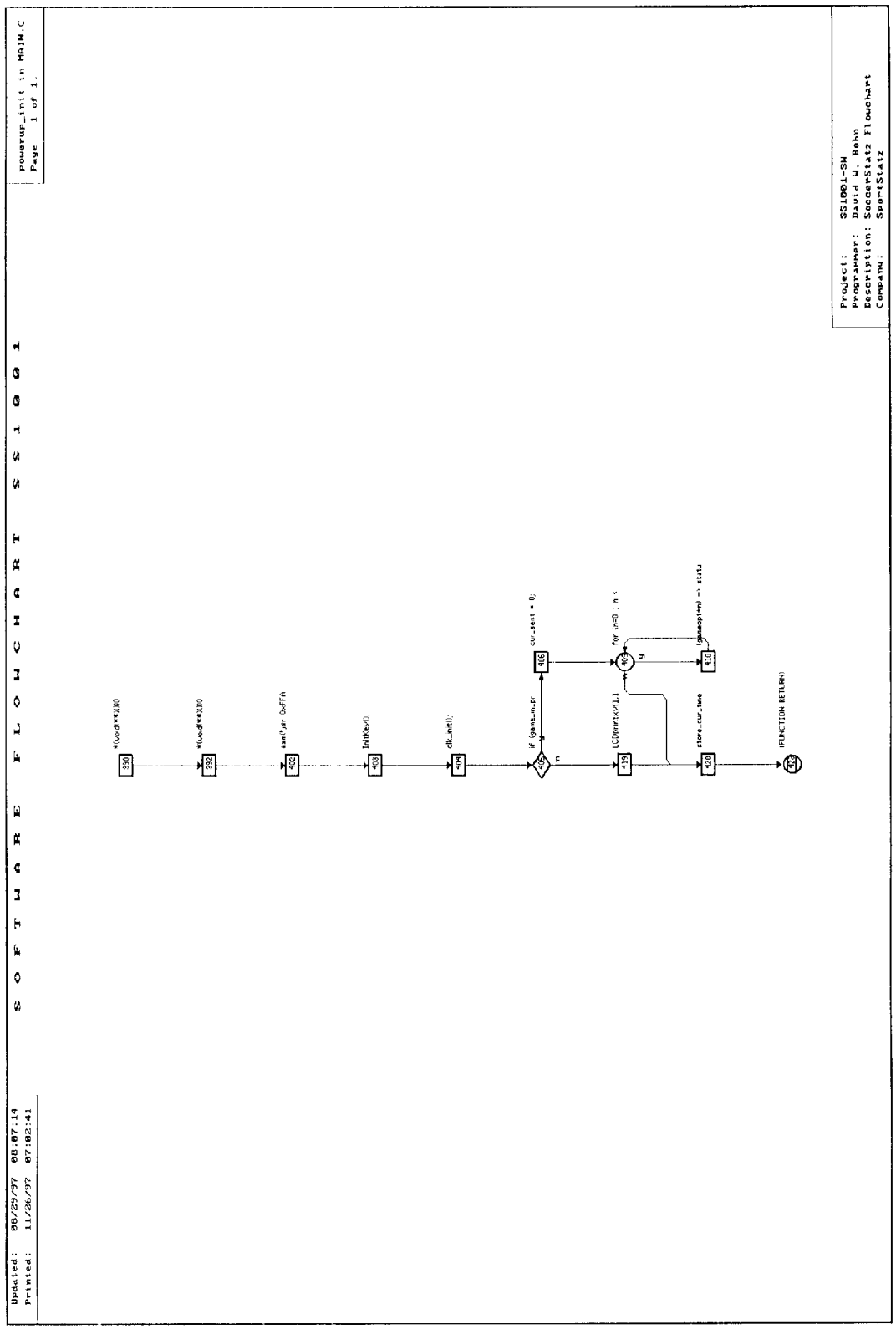
Figure 11:
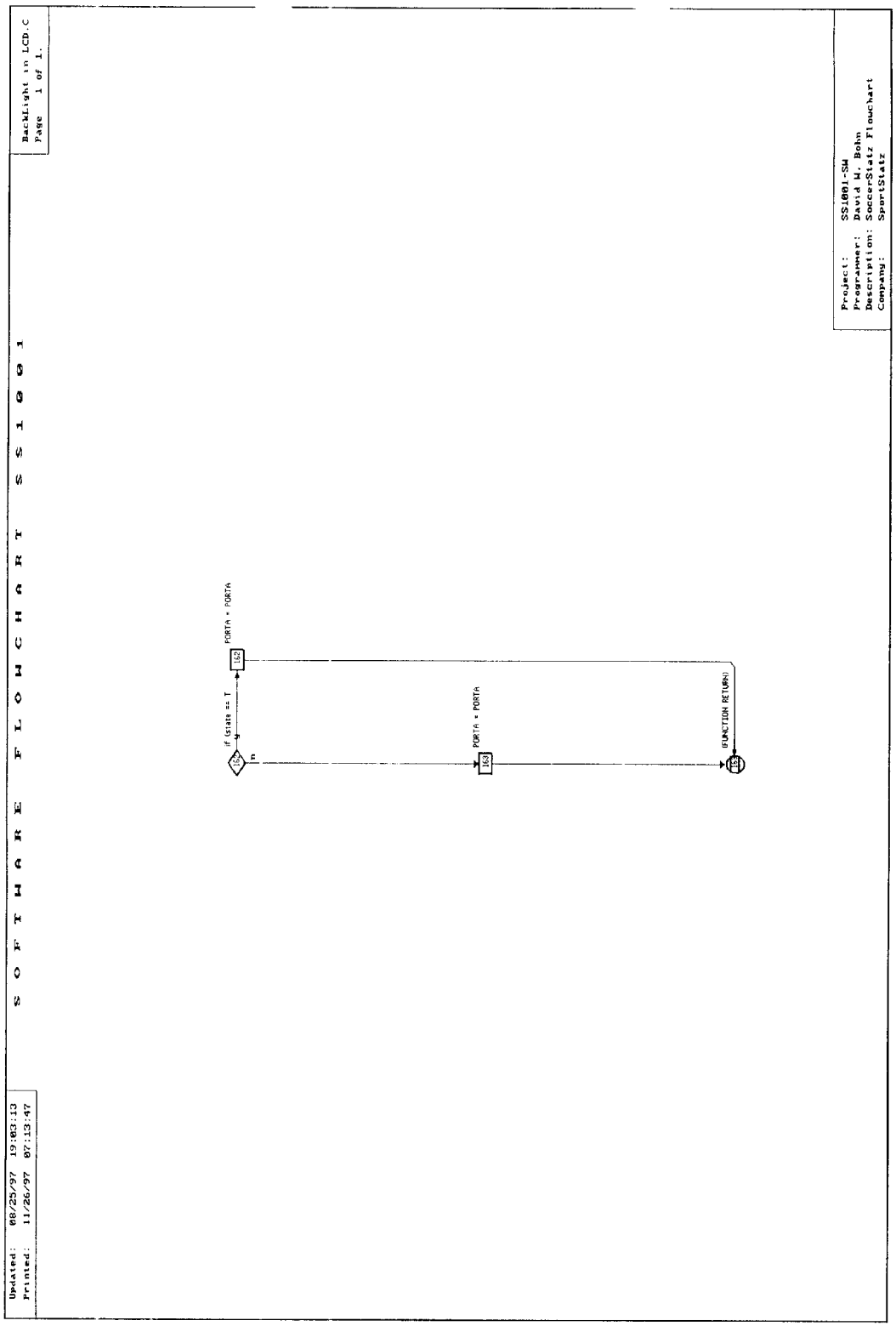

Referring to FIGS. 3, 5 and 6, there is shown the software flow charts for the hand held computer used in accordance with the present invention. Therein depressing the switch 100 initializes the computer. After initialization, the computer enters the startup routine wherein relevant data is entered such as time, date, field conditions, weather conditions, referees and other like information which may be useful in interpreting the game data. Following setup, the selected game is started activating the timer. The game data acquisitions are then inputted in response to activities on the field through the function switches and action switches until completion of the game as timed out by the timer. At any tie during the course of the game the scorer may enter the edit mode and revise or review as desired the specifics of any action, by going to the action and sequentially revising the data as required. The scorer may also renter the setup routing as required to make any revisions required by changed conditions. Upon completion of the game, the computer and the display are returned to the setup screen. Upon completion of all desired entries, the on/off switch 100 is depressed to disable the computer.

EXAMPLE

For purposes of describing the use of the hand-held computer 10 to track the activities of a soccer event, the following conditions will be assumed for illustrative purposes only, realizing that each type of activity will also generate a similar method for inputting and tracking the data during the course.

For the example, a regular soccer game is played on a regulation field under good weather conditions. A first game is being recorded and a goal is scored from the penalty area by home player 21 with an assist from player 31 at elapsed time 5:00 in the first half of play.

At the start of the game, the scorer initializes the system by depressing the illustrated "on/off" key 100 in the lower right hand corner of the keypad 24.

The lower line of the illuminated display then displays the input options for proceeding. The first option is the game number being recorded.

The scorer inputs the number 1 on the numerical area of the keypad 24. The display 20 on the lower line then prompts for entry of field, field length and weather conditions. The scorer then sequentially enters the relevant response in response to serial prompts. Upon completion of entering the game condition data, the score depressed setup key 62 to exit the setup routine and enter the game mode.

At this time, the upper status line o f the display indicates the initial score, the game number and the starting time. At the start of the game, the scorer depresses the start key of the function keys. This starts the game timer and displays the first half on the upper status line.

When the shot resulting in the goal is scored, the scorer depresses the shot key in the activity array. The lower line of the display then prompts for the type of shot and the scorer actuates the "goal" key. The activity line then displays the "GOAL" and prompts for entry of the player number which is then entered on the numerical portion of the keypad and thereafter the team designation which is entered on the function keys as "US". The scorer is then prompted for entry of the field location, and for illustrative purposes, the scorer depresses a key in the penalty area most closely designation the area from which the shot occurred. Upon entry the third line of the display shows the field position and time of goal.

The scorer then depresses the assist key to similarly enter the specifics regarding the assist for the goal. Upon entry the assist is displayed as a separately numbered event on the second line of the display with a time corresponding to the time of the goal and the location from which the assist occurred. After completion, the displays returns to the input mode awaiting entry of additional game activities.

If at any time during the course of the game it is desired to review or revise any of the inputted activities, the score may scroll through the various recorded events and make appropriate changes. At the conclusion of the game, the same is exited by depressing the switch 60.

To download the results of the game to a processor for archiving and reporting, the scorer depresses the communications function key to transfer the data.

Figure 4:
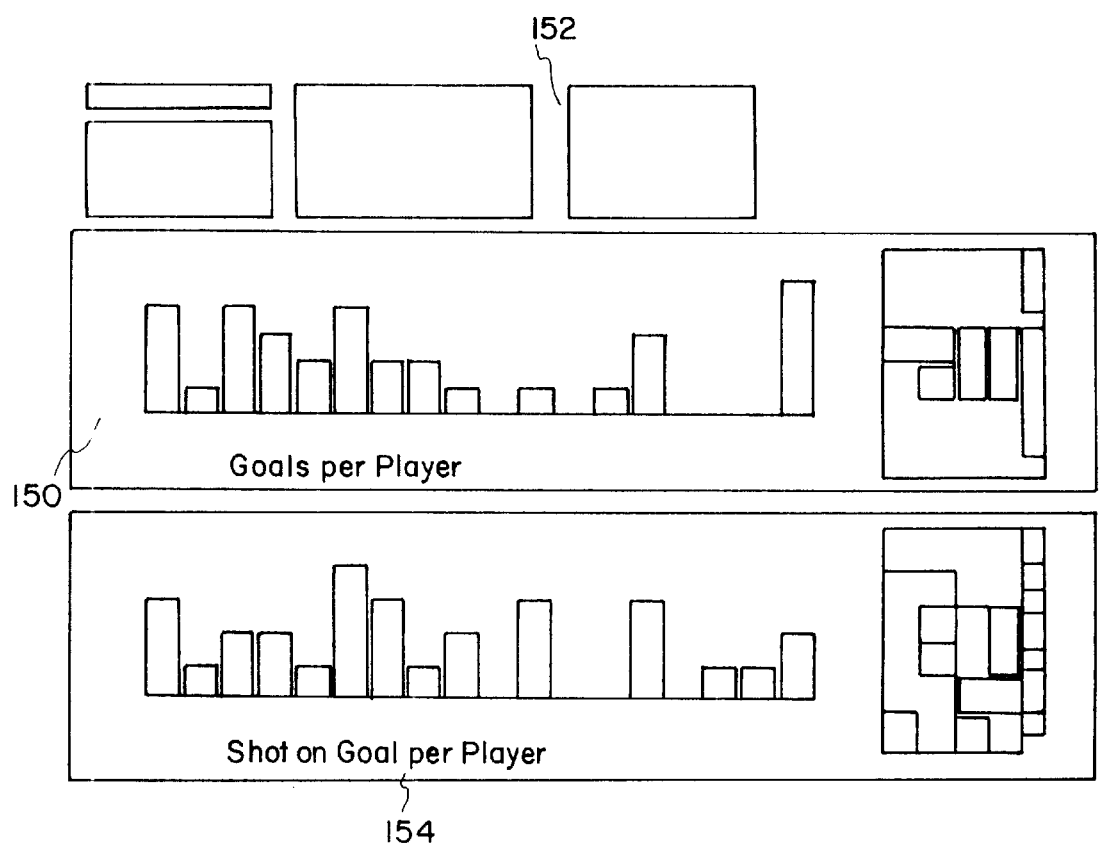
FIG. 4 is an example of a summary report of the data output generated during a game by the hand held scoring computer of the present invention.

Referring to FIG. 4, there is shown a representative printout display of a selective compilation of the various data inputted in to the hand held computer during the course of a soccer game. As those skilled in the art will appreciate, the illustration is but one of the many formats readily usable in conventional presentations to statistically and graphically depict the information.

More particularly, the report shows the goal statistics in block 150, the game statistics in block 152 and the shots on goal in block 154. For each of the players tracked during the course of the games or games analyzed, there is a bar graph representation of the goals scored by each player. Therein by conventional programming the player numbers entered during the course of the game have been converted into players' names. Additionally, the goal block, in the right hand portion, shows the frequency of goals by location, also as inputted during the course of the game. This enables the review or coach of the team to the areas of greatest productivity for goal scoring.

The game blocks 152 displays the game or games selected for analysis, and the team or player being reviewed.

The shots on goal block similarly displays the shots on goal by the individual players as well as the field location for the recorded shots. It will be appreciated that each data category can be numerically or graphically depicted from the data secured during the desired games.

While the present invention has been described with reference to the preferred embodiment, those skilled in the art will appreciate that further modification, uses and adaptations of the invention are possible, and accordingly the present invention is to be defined only by the accompanying claims.

What is claimed:

1. A portable scoring device for tracking activities of a soccer event, comprising:
   a computer having display means, memory means and data entry means;
   a. first means associated with said data entry means for inputting player data including a first plurality of touch-sensitive switches;
   b. second means associated with said data entry means for inputting conditions regarding said soccer event for which it is desired to track activities including a second plurally of touch-sensitive switches;

c. third means associated with said data entry means including timing means for starting the timing of the soccer event and displaying such timing on said display means;

d. fourth means associated with said data entry means for indicating activities associated with said soccer event including a third plurality of touch-sensitive switches;

e. fifth means associated with said data entry means including a fourth plurality of touch-sensitive switches arranged in a rectangular array and including individual switches representing discrete locations of the playing area for said soccer event for inputting the location of an activity being inputted;

said display means displaying the values of the inputted information to provide the operator of the device with visual indication as to the specifics of a recorded aspect of the soccer event.

2. The portable scoring device as recited in claim 1 wherein said player data comprises player identification and team representation.

3. The portable scoring device as recited in claim 1 wherein said activities associated with said soccer event include shots, goals, and assists.

4. The portable scoring device as recited in claim 3 wherein said activities further include passes and types of passes.

5. The portable scoring device as recited in claim 3 wherein said activities further include corner kicks.

6. The portable scoring device as recited in claim 1 further including editing means operatively associated with said memory, said display means and said data entry means for revising subsequent to inputting player data, activities and location.

7. The portable scoring device as recited in claim 1 wherein a first legend adjacent said display means graphically depicts playing field boundaries.

8. The portable scoring device as recited in claim 1 wherein a second legend adjacent said display means delineates current soccer event information thereon.

9. The portable scoring device as recited in claim 1 wherein said current event information comprises event score and elapsed time of the event.

10. The portable scoring device as recited in claim 1 wherein said computer includes communication means for transferring recorded information to separate processing means for storing, reviewing and analyzing said information.

11. The portable scoring device as recited in claim 1 wherein activities include penalties and category of penalty.

12. The portable scoring device as recited in claim 1 wherein said activity includes player substitution including identifying the player entering and the player departing.

* * * * *